United States Patent
Osenar et al.

(10) Patent No.: US 7,374,837 B2
(45) Date of Patent: *May 20, 2008

(54) LIQUID ELECTROCHEMICAL CELL STACKS AND MANUFACTURING METHODS FOR SAME

(75) Inventors: Paul Osenar, Westford, MA (US); Paul Sabin, Needham, MA (US); Mohammad Enayetullah, Sharon, MA (US); Richard M. Formato, Grafton, MA (US)

(73) Assignee: Protonex Technology Corporation, Southborough, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/086,962

(22) Filed: Mar. 21, 2005

(65) Prior Publication Data

US 2006/0057436 A1   Mar. 16, 2006

Related U.S. Application Data

(63) Continuation of application No. PCT/US03/30322, filed on Sep. 23, 2003.

(51) Int. Cl.
   *H01M 2/08*   (2006.01)
   *H01M 8/02*   (2006.01)
   *H01M 8/08*   (2006.01)
   *H01M 8/24*   (2006.01)

(52) U.S. Cl. .............................. 429/35; 429/32; 429/36; 429/37; 429/38

(58) Field of Classification Search .................... None
   See application file for complete search history.

(56) References Cited

U.S. PATENT DOCUMENTS

| 3,278,336 | A | 10/1966 | Uline et al. |
| 3,615,838 | A | 10/1971 | Erickson |
| 2002/0068212 | A1 | 6/2002 | Osenar et al. |
| 2003/0096153 | A1 | 5/2003 | Osenar et al. |
| 2005/0244703 | A1* | 11/2005 | Osenar et al. ............... 429/35 |
| 2006/0127735 | A1* | 6/2006 | Sabin et al. ............... 429/35 |

FOREIGN PATENT DOCUMENTS

WO   WO 2004/047210   *  6/2004

OTHER PUBLICATIONS

International Search Report for PCT/US03/30322, published with WO 2004/027896, Apr. 1, 2004.

* cited by examiner

*Primary Examiner*—Jonathan Crepeau
(74) *Attorney, Agent, or Firm*—Chistine C. O'Day; Edwards Angell Palmer & Dodge LLP

(57) ABSTRACT

The present invention provides liquid electrolyte electrochemical cassettes and stacks thereof which are suitable for a use in a variety of electrochemical, ion exchange, and battery applications. The present invention also provides methods of manufacturing the liquid electrolyte cassettes and stacks of the invention. In certain preferred embodiments, the invention provides cassettes and stacks which are suitable for use in fuel cell and flow through battery applications.

44 Claims, 12 Drawing Sheets

SEALED SCREEN FLOW FIELD

SEALED SCREEN FLOW FIELD

SEALED ELECTRODE

EXPLODED VIEW
SEALED ELECTROLYTE FLOW FIELD
SUBASSEMBLY

LIQUID ELECTROLYTE
SCREEN FLOW FIELD
REPEAT UNIT

SEALED SCREEN FLOW FIELD

SEALED ELECTRODE

EXPLODED VIEW
SEALED ELECTROLYTE FLOW FIELD
SUBASSEMBLY

LIQUID ELECTROLYTE
BIPOLAR PLATE FLOW FIELD
REPEAT UNIT

LIQUID ELECTROCHEMICAL CELL STACKS AND MANUFACTURING METHODS FOR SAME

This application claims the benefit of PCT Application PCT/US03/30322, filed 23 Sep. 2003, which in turn claimed benefit to U.S. Provisional Patent Application 60/412,967, filed Sep. 23, 2002, which application is incorporated by reference.

BACKGROUND OF THE INVENTION

1. Field of the Invention

This invention relates to the fabrication of liquid electrolyte-based cassettes and stacks made via encapsulation of the component parts by a resin or thermoplastic matrix. The present invention provides liquid electrolyte electrochemical cassettes and stacks in which at least one reagent and an electrolyte are circulated within the stack or cassette during operation. Cassettes and stacks of the invention are particularly well suited for use in various electrochemical applications, including fuel cells and flow through batteries as well as ion-exchange applications.

2. Background

Electrochemical cells, and particularly, liquid electrolyte batteries and fuel cells are well known in the art. Liquid electrolyte fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. The large investment into fuel cell research and commercialization indicates the technology has considerable potential in the marketplace. However, the high cost of fuel cells when compared to conventional power generation technology has deterred their potentially widespread use. The cost of fabricating and assembling fuel cells can be significant, due to the materials and labor involved, and as much as 85% of a fuel cell's cost can be attributed to manufacturing. Current applications of liquid electrolyte fuel cells are limited to space and military applications requiring high power output and where cost is of little concern.

A single cell liquid electrolyte fuel cell consists of a gas permeable anode and a gas permeable cathode separated by a ionically conducting liquid layer. Energy conversion begins when the reactants, reductants and oxidants, are supplied to the anode and cathode compartments, respectively, of the liquid electrolyte fuel cell. Oxidants include pure oxygen, oxygen containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce charge carriers (e.g. ionic species such as protons or hydroxyl ions which are suitable for use in fuel cell applications), which migrate through the electrolyte to the cathode. At the cathode, the charge carriers react with the oxidant. The overall electrochemical redox (reduction/oxidation) reaction is spontaneous, and energy is released. Throughout this reaction, the liquid electrolyte serves to prevent the reductant and oxidant from mixing and to allow ionic transport to occur. The gas permeable anode and cathode prevent leaching of the liquid electrolyte into either the oxidant or the reductant flow field.

The present invention builds on the fuel cell cassette and related methods of manufacture described in our World Publications WO 02/43173 and WO 03/036747, and International Patent Application PCT US03/12684, all of which applications are incorporated herein by reference.

Briefly, WO 02/43173 details a three-step process for the formation of membrane based fuel cell cassettes which includes the following:

1) Sealing of unused manifold openings/ports on each of the particular flow fields (fuel, oxidant, and coolant). For example, in the case of the oxidant flow field, ports utilized for the distribution of fuel and coolant (on other layers) must be sealed about their perimeter to prevent the mixing of these input streams.

2) Sealing of all the ports within the membrane electrode assemblies (MEA) to prevent the leakage of the reactants within the MEA layers.

3) Layering these components (appropriately sealed as described) within a mold or fixture in a method prescribed by the particular stack design. Once the pieces are assembled within the fixture, a resin is introduced about the periphery. Using resin transfer molding or injection molding techniques, the resin is forced into the edges of the cassette assembly. Once hardened, it provides structural support and edge sealing over the assembly.

The resulting fuel cell cassette is then transformed into a fuel cell stack with the addition of end plates. Such a construction provides appropriate manifolding and a means of compression.

Building on that technology, WO 03/036747 and International Patent Application PCT US03/12684 detail a one step sealing process for the formation of membrane based, fuel cell cassettes which included providing a precut MEA and either bipolar plates or flow fields and separator plates wherein each component of the cassette or stack is precut with manifold openings and channels or openings for introducing a sealant into each component of the stack. The assembled stack is then encapsulated with a resin such that the resin encapsulates a substantial portion of the periphery of the cassette and stack and seals at least a portion of the components adjacent to the sealant channels or openings.

Based on our advances in the fabrication of membrane based electrochemical devices, it would be highly desirable to develop fuel cell stacks and cassettes which operate using a liquid electrolyte instead of an ion conducting membrane, with similar improvements in reliability and further reductions in labor and associated costs.

SUMMARY OF THE INVENTION

The present invention provides notable improvements over conventional processes. In particular, the present invention allows for the formation of electrochemical cassettes or stacks which comprise a liquid electrolyte and optionally comprise one or more liquid reagents. The electrochemical cassettes and stacks of the invention can be prepared using one or more of the fabrication processes for encapsulating electrochemical cassettes or stacks and isolating manifold porting from various flow fields of the stacks discussed infra. Indeed, due to the novel design of the present invention, a liquid electrolyte is used in place of the polymeric ion conducting material typically used in conventional fuel cell and electrochemical cassettes. The liquid electrolyte layer of the present invention provides increased charge density and temperature control not available using polymeric ion conducting membranes (ICM) technologies. Thus, in preferred aspects of the invention, electrochemical cassettes and stacks are provided which are suitable for use in flow through batteries and fuel cell applications in which a liquid electrolyte layer separates the fuel and oxidant reagents within the stack or cassette.

The fuel cell cassette can be manufactured from the same materials and using the methods as described in World Publications WO 02/43173 and WO 03/036747, and International Patent Application PCT/US03/12684. The basic principle exploited allows for an edge-sealing material to block certain ports while leaving others open, based on the number, shape and placement of holes and channels cut within the flow fields and/or other components. This design and process would be especially useful for the formation of electrochemical cassettes via resin transfer molding or injection molding techniques. Typically, the membrane electrode assembly component of the electrochemical cassettes described in the above referenced patent applications is replaced with two porous electrodes and a liquid electrolyte flow field. As described in those previous patent applications, this innovation allows for the production of fuel cell stacks with a minimum of labor, thereby significantly reducing the cost of these systems.

The electrochemical cassettes of the present invention may be used in fuel cell systems and in flow through battery applications which utilize one or more liquid or liquid suspensions as reagents. For example, the cassettes of the invention may be useful in phosphoric acid or alkaline fuel cell applications based on hydrogen or other fuels. The electrochemical cassettes of the present invention may also be used in a host of electrochemical applications that utilize flowing electrolytes other than the fuel cell systems discussed above. These applications include but are not limited to batteries, metal/air fuel cells, electrolyzers, concentrators, compressors and reactors.

Related methods and other aspects of the invention are discussed infra.

DETAILED DESCRIPTION OF THE INVENTION

Figure 1:
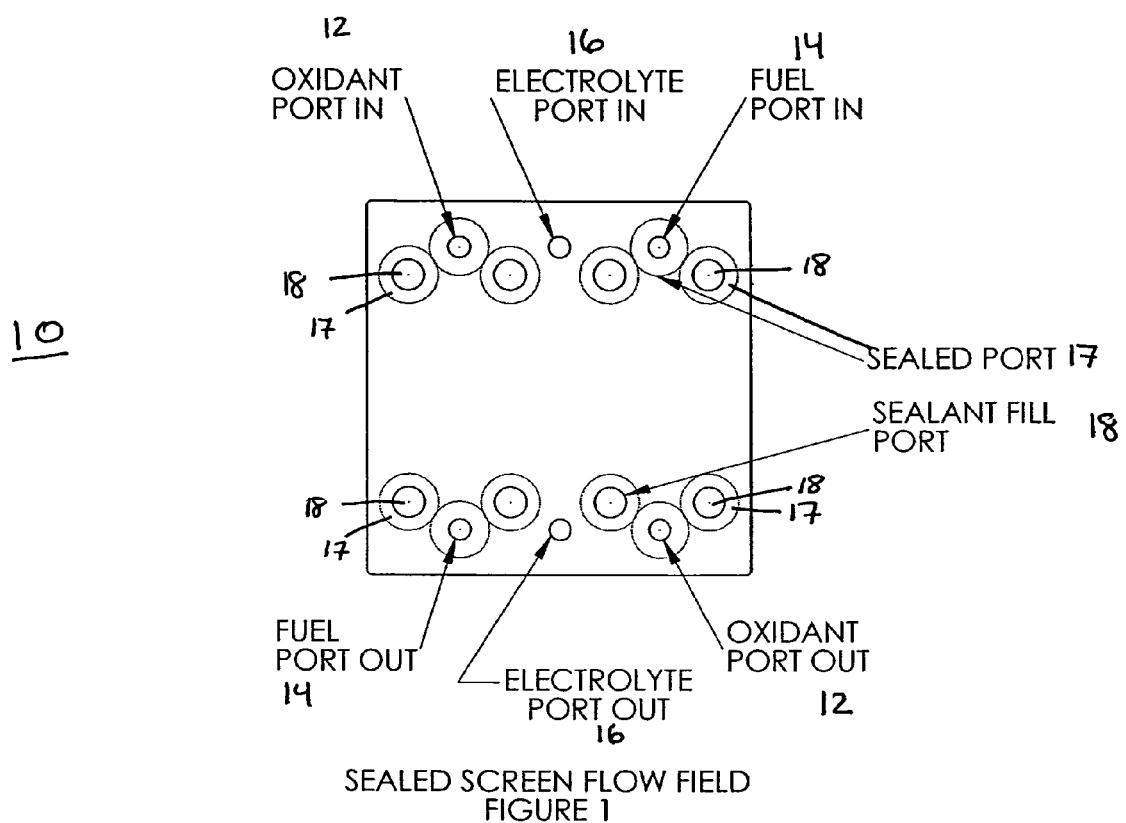
FIG. 1 shows a liquid electrolyte flow field with manifold and electrolyte opening and sealant manifold opening hole patterns for use as a in a liquid electrode assembly (LEA) of a preferred embodiment of the invention. The liquid electrolyte flow field is depicted after incorporation into the liquid electrolyte assembly with holes sealed (except for those corresponding to the electrolyte manifold).

The present invention provides a variety of cassettes suitable for use in electrochemical applications and ion exchange applications. As noted above, cassettes of the invention are particularly well suited for use in fuel cells.

Cassettes of the invention generally comprise a liquid electrolyte assembly and a first and second reagent flow field. The liquid electrolyte assembly has at least one reagent manifold opening extending through the thickness thereof, at least one electrolyte manifold opening extending through the thickness thereof, and at least one sealant manifold opening extending through at least a portion of the thickness thereof. In certain preferred embodiments, the sealant manifold openings extend through the thickness of the liquid electrolyte assembly. Each of the first and second reagent flow fields also have at least one reagent manifold opening, at least one electrolyte manifold opening, and at least one sealant manifold opening extending through the thickness thereof. Preferably, the liquid electrolyte assembly, the first reagent flow field and the second reagent flow field are assembled relative to each other such that the reagent and electrolyte manifold openings are aligned, and at least a portion of each sealant manifold opening are aligned.

As used herein, the terms "sealant manifold opening" and "injection holes" are used interchangeably to refer to the channels or manifolds intended to deliver a resin or sealant to specified portions of the cassette or stack.

The peripheral edges of the liquid electrode assembly, the first reagent flow field, and the second reagent flow field are encapsulated together by a resin such that the periphery of the cassette is encapsulated by the resin. A sealant is introduced into the sealant manifold openings to enclose those reactant manifold openings which are not intended to deliver material, e.g., gas, liquid or suspension, to a particular flow field. To achieve isolation of those reactant manifolds not intended for delivery of a material to a particular flow field, e.g., unused reactant manifolds, the resin applied to the periphery of the cassette is contacted with at least a portion of the sealant introduced into the sealant manifold. Alternately, an unused manifold which is distant from the periphery of the cassette may be isolated from a flow field by enclosing with sealant introduced to the flow field through one or more injection holes such that the sealant introduced into the sealant manifold substantially encloses the reagent manifold. Although complete enclosure of the reagent manifold is preferred such that the sealant forms a ring completely surrounding the reagent manifold opening, mostly surrounding the reagent manifold may also be acceptable in certain situations. As the skilled artisan will appreciate, if the rate of fluid or material escape from the reagent manifold into the flow field does not impair the performance of the cassette or stack, then such sealant enclosures are also acceptable.

In other preferred embodiments, isolation of those unused reactant manifolds can be achieved by virtue of the resin alone, e.g., the resin being introduced into the cassette by a channel opening to the periphery of the one or more flow field layers thereby isolating the unused reactant manifold from the flow field. For certain cassettes which isolate manifolds by introducing resin into channels opening to the periphery of the cassette, the sealant manifold may not be necessary such that the liquid electrode assembly and any non-porous layers may optionally omit the sealant manifold openings.

Preferred cassettes suitable for use in electrochemical and fuel cell applications further include at least two electrodes which are preferably fabricated with a liquid electrolyte flow field to form a liquid electrode assembly prior to cassette assembly. In preferred embodiments, the electrodes are porous conductive materials and have a liquid electrolyte flow field interposed between two electrodes. More preferably, the electrodes are gas permeable but liquid impermeable such that gaseous reactants may diffuse through the electrode to reach the electrode-electrolyte interface but the electrolyte is restricted to the liquid electrolyte flow field. In preferred liquid electrolyte assemblies, the surfaces of the electrodes in contact with the liquid electrode flow fields are coated with a catalyst suitable for reduction and/or oxidation of the fuel or the oxidant (or other set of anode and cathode reactions).

Electrode layers are typically made from porous carbon, either in the form of a fabric or a paper. Several commercial suppliers of these electrode layers are known (E-Tek, SGL, Spectracorp, among others). The electrodes are coated with catalyst to facilitate the reactions necessary on the cathode and anode. Catalysts include both organic and inorganic (i.e., metallic) catalysts. In certain preferred embodiments, the catalyst is selected from finely divided platinum, nickel, palladium, ruthenium and inorganic or organometallic metal complexes, among others. In the current embodiment, all of the ports are sealed in each of the electrode layers.

Separator and/or bipolar plates should be thin, lightweight, durable, electrically conductive and corrosion resistant. Preferably, stainless steel is used for the separator plate. However, graphite, titanium or any corrosion resistant alloy may also be used. Alternatively, one or more of the separator plates could be fashioned from a composite polymeric/graphite material.

For use in fuel cell applications, cassettes of the invention are typically utilized in the form of a stacked assembly comprising the following components: liquid electrolyte assemblies, reagent flow fields, and separator plates. In other preferred embodiments liquid electrolyte assemblies and bipolar plates are stacked to form the cassettes of the invention where the bipolar plate integrates one or two reagent flow fields into the surfaces of a non-porous separator plate.

Preferred fuel cell cassettes of the invention comprise a liquid electrolyte assembly having at least one reactant manifold opening extending through the thickness thereof, at least one electrolyte manifold opening extending through the thickness thereof, and at least one sealant manifold opening extending through the thickness thereof; a fuel flow field having at least one reactant manifold opening extending through the thickness thereof, at least one electrolyte manifold opening extending through the thickness thereof, and at least one sealant manifold opening extending through the thickness thereof; an oxidant flow field having at least one reactant manifold opening extending through the thickness thereof, at least one electrolyte manifold opening extending through the thickness thereof, and at least one sealant manifold opening extending through at least a portion of the thickness thereof.

The liquid electrolyte assembly, the fuel flow field, and the oxidant flow field are typically assembled relative to each other such that the reactant manifold openings are aligned, and at least a portion of the sealant manifold openings are aligned. The peripheral edges of the liquid electrolyte assembly, the fuel flow field, and the oxidant flow field are encapsulated together by a resin such that the periphery of the fuel cell cassette is encapsulated by the resin and a sealant is introduced into the sealant manifold openings to enclose those reactant manifold openings which are not intended to deliver material to a particular flow field. To achieve encapsulation, the resin applied to the periphery of the fuel cell cassette is contacted with at least a portion of the sealant introduced into the sealant manifold. Alternately, encapsulation can be achieved by virtue of the sealant alone, e.g., sealant being forced into the cassette through an opening in the periphery of one or more flow field layers. In which case, the sealant manifold openings can be omitted from each of the cassette components.

In preferred electrochemical cassettes and stacks of the invention, the liquid electrolyte assembly is prepared by the three step process disclosed in World Publication WO 02/43173, which is incorporated in its entirety in the instant application. Briefly, two electrode layers are provided, each comprising a gas permeable porous conductive layer (also referred to herein as a porous conductive electrode) coated on one surface with a catalyst and a electrically insulating, chemically inert porous flow field (e.g., inert to the electrolyte at the operating temperatures of the electrochemical cassette) having openings for the reagent manifold and the electrolyte manifold. The electrode layers and the liquid electrolyte flow field may further comprise one or more openings for the sealant manifold. Each of the electrolyte manifold openings of the electrode layers are sealed by introducing a resin into substantially the entire periphery of the electrolyte manifold openings. The electrode layers and the liquid electrode flow field are then assembled and a resin is introduced into the reagent manifold openings such that substantially all of the voids and pores in both electrodes and the liquid electrolyte flow field surrounding the reagent manifold openings are filled with resin (e.g., the voids are "blinded" by the resin). After curing, setting, hardening or otherwise solidifying the resin, the components of the liquid electrolyte assembly are bound together. The formed/completed liquid electrolyte assembly is ported such that only the liquid electrolyte is able to access the liquid electrolyte flow field once the liquid electrolyte assembly is incorporated into an electrochemical cassette or stack. The remaining ports are blocked such that the reagents pass through the LEA to their respective flow fields for distribution within the device.

Figure 8:
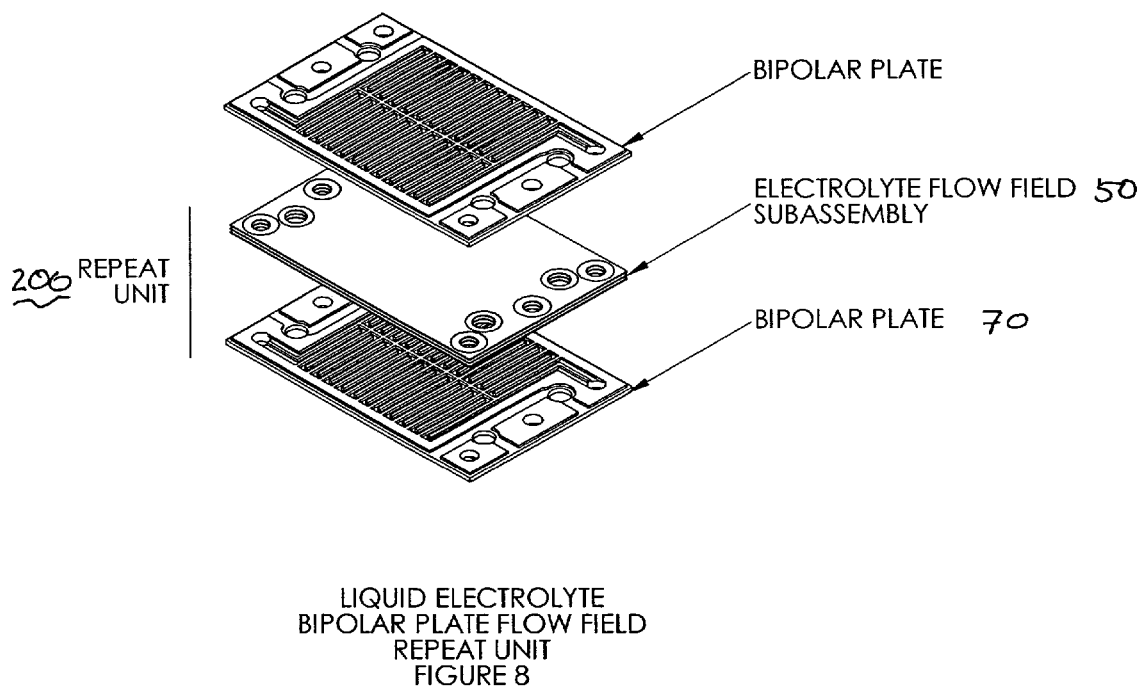
FIG. 8 shows an expanded view of the components of an electrochemical cassette of a preferred embodiment of the invention prior to their encapsulation together.
Figure 9:
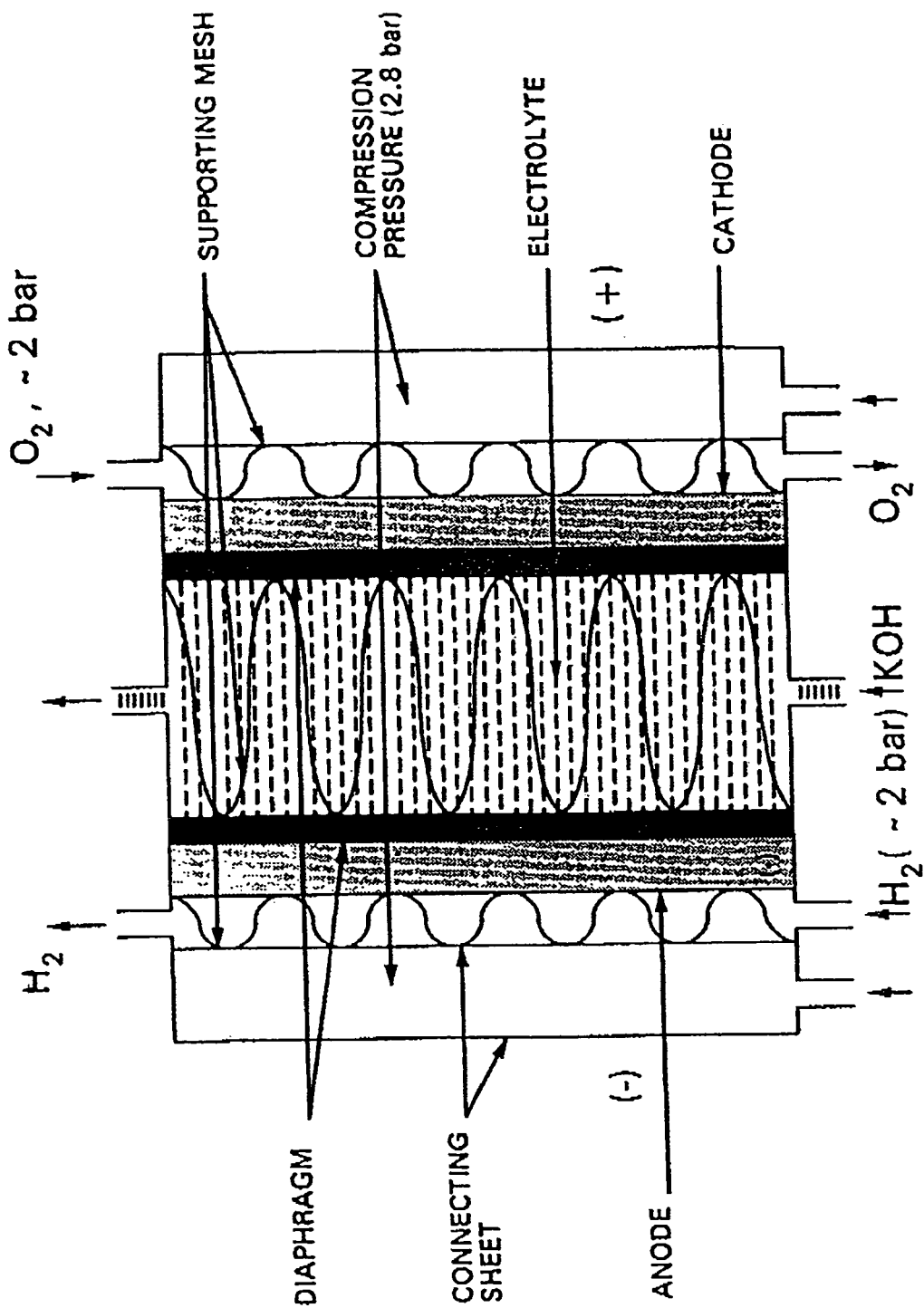
FIG. 9 is a cross-sectional view of an operating liquid electrolyte fuel cell stack of a preferred embodiment of the invention.
Figure 10:
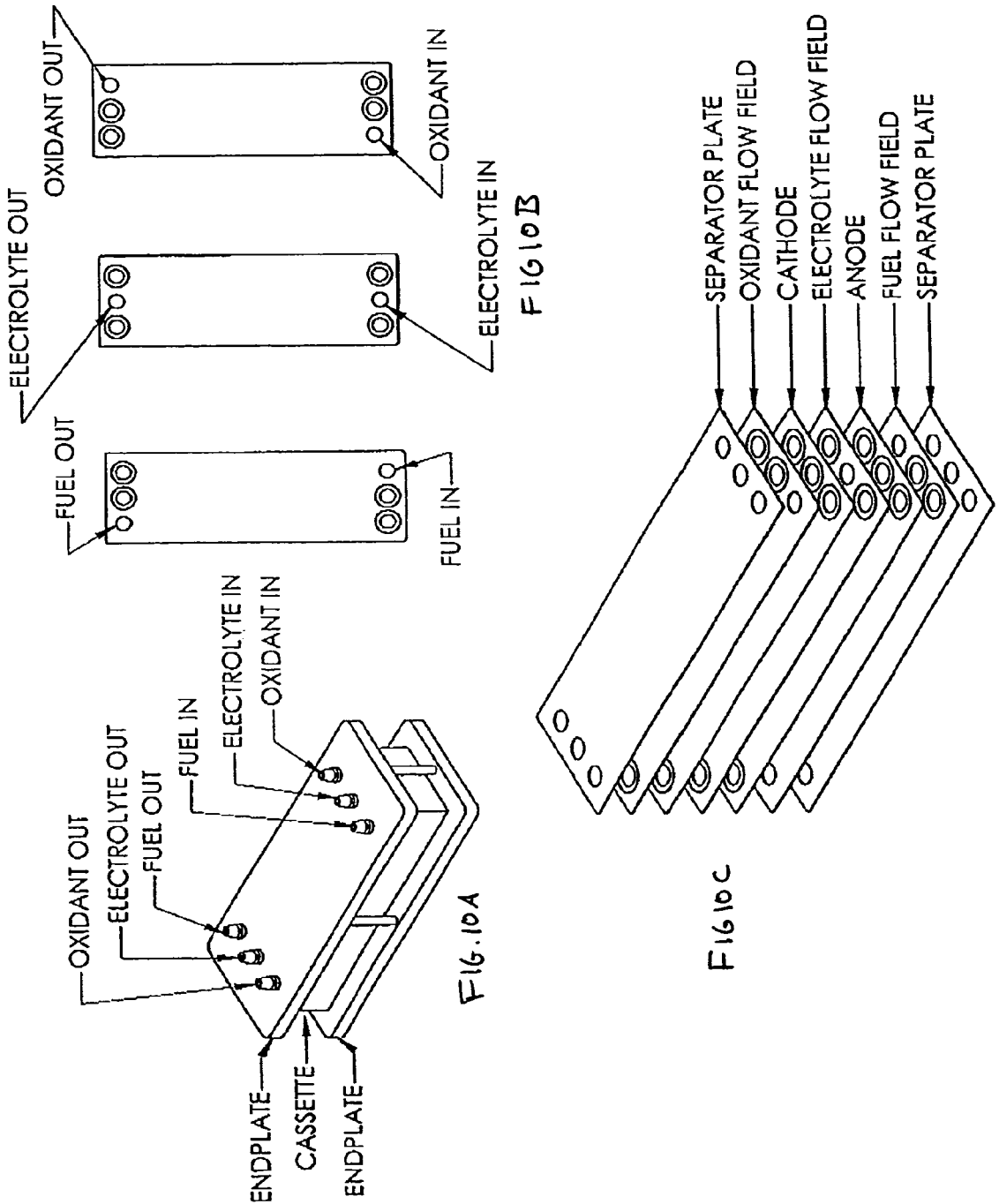
FIGS. 10A-C show a liquid electrolyte electrochemical stack prepared by presealing manifold ports of the reagent and electrolyte flow fields prior to assembly and encapsulation.

Cassettes suitable for use in fuel cell, electrochemical and ion exchange applications may also be constructed using one or more bipolar plates (see, for example, FIG. 8). Typically, two reagents are selectively delivered to opposing parallel faces of the bipolar plate thereby reducing the number of individual components being incorporated into to the cassette. In preferred embodiments, cassettes having one or more bipolar plates in conjunction with a liquid electrode assembly. For example, as shown in FIG. 8, an electrochemical cassette may be assembled by alteration of liquid electrolyte assemblies and bipolar plates to form the cassette. A bipolar plate includes an oxidant flow field, a fuel flow field, and a separator plate which is interposed between the fuel flow field and the oxidant flow field. The bipolar plate has at least one manifold opening extending through the thickness thereof, at least one electrolyte manifold opening extending through the thickness thereof. The liquid electrode assembly, and the bipolar plate are assembled relative to each other such that the reactant manifold openings are aligned, and at least a portion of each sealant manifold openings are aligned. The peripheral edges of the liquid electrode assembly and the bipolar plate are encapsulated together by a resin such that the periphery of the fuel cell cassette assembly is suitably bound together or otherwise affixed in order for the cassette to operate as intended. A sealant is introduced into the sealant manifold openings, e.g., injection holes, to enclose those manifold openings such that each flow field is accessible by only the manifold delivering the intended reagent or electrolyte thereto. Encapsulation is achieved as described above.

In another aspect, the present invention provides stacks suitable for use in fuel cells, flow-through batteries, electrochemical or ion exchange applications. Stacks of the invention comprise at least one cassette of the present invention, and at least one end plate having openings which align with the reagent and electrolyte manifold openings of the cassette. Each cassette is assembled relative to each other such that the reagent and electrolyte manifold openings are aligned. The end plate is assembled on the top and/or bottom of the stack of fuel cell cassettes such that the openings in the end plates align with the reagent manifold openings.

The means by which the end plates and electrochemical cassettes are assembled to form the electrochemical stack provided by the present invention is not particularly limited and may include compression gasket seals and co-encapsulation in a resin and/or sealant. In preferred embodiments, the end plate is assembled with the electrochemical cassette prior to encapsulation by the resin and prior to introduction of the sealant such that the end plate and electrochemical cassette are encapsulated and sealed in combination, e.g., simultaneously.

In other preferred embodiments of the present invention, one or more electrochemical cassettes are manufactured, then aligned in a stack together with one or more compression gaskets and end plates. A compression means such as through bolt, tie downs or other mechanical fasteners are attached to the fuel cell stack to mechanically seal the fuel cell cassettes and end plates.

In yet another aspect, the present invention provides methods of manufacturing cassettes of the invention for use in fuel cells, flow through batteries, electrochemical or ion exchange applications. Methods of the invention for manufacturing an electrochemical cassette of the present invention generally comprise the steps of:

(a) providing at least one liquid electrolyte assembly comprising two gas permeable porous conductive electrodes and a liquid electrolyte flow field interposed between the porous conductive electrodes and each component having at least one reagent manifold opening extending through the thickness thereof and at least one electrolyte manifold opening extending through the thickness thereof, wherein each electrolyte and reagent manifold opening of the porous conductive electrodes is at least substantially surrounded by a resin and each of the reagent manifold openings of the liquid electrolyte flow field is surrounded by a resin;

(b) providing at least one first reagent flow field having at least one reagent manifold opening extending through the thickness thereof, at least one electrolyte manifold opening extending through the thickness thereof, and at least one sealant manifold opening extending through at least a portion of the thickness thereof;

(c) providing at least one second reagent flow field having at least one reagent manifold opening extending through the thickness thereof, at least one electrolyte manifold opening extending through the thickness thereof, and at least one sealant manifold opening extending through at least a portion of the thickness thereof;

wherein the liquid electrolyte assembly, the first reagent flow field, and the second reagent flow field are assembled relative to each other such that the reagent manifold openings and electrolyte manifold openings are aligned; and sealing the periphery of the cassette and a portion of the cassette surrounding the sealant manifold by applying a pressure differential to the cassette Preferably, the sealing step is achieved by applying a pressure differential to the cassette such that the peripheral edges of the liquid electrolyte assembly, the first reagent flow field, and the second reagent flow field are encapsulated together by a resin. In that way, the periphery of the cassette is encapsulated by the resin.

In particularly preferred cassette manufacturing methods of the present invention, the sealing step further comprises the steps of surrounding the stacked formation with a resin; introducing a sealant into the sealant manifold openings; applying a pressure differential means to the stacked formation for a predetermined interval such that the resin is introduced into the peripheral edges of the stacked formation and such that the sealant is introduced into a portion of the cassette surrounding the sealant manifold openings; allowing the sealant to solidify thereby enclosing those manifold openings of reagent manifold containing a reagent that does not correspond to a reagent for distribution to a particular flow field and enclosing the electrolyte manifold of the electrode manifold that do not correspond to the liquid electrode flow field; and allowing the resin to set, cure, solidify or otherwise harden thereby forming a bond between the peripheral edges of the liquid electrolyte assembly and the first and second reactant flow fields such that the periphery of the stack is encapsulated within the resin.

Pressure differential means could include pulling a vacuum within the assembly, i.e. through the reactant and electrolyte manifolds (also known as vacuum assisted resin transfer molding). Alternatively a pressure differential could be realized with the injection of resin and/or sealant from outside the assembly, allowing for suitable venting, i.e. through the reactant and electrode manifolds (including pressure assisted resin transfer molding or injection molding).

Although the liquid electrode flow field typically provides sufficient temperature regulating capacity during most electrochemical processes, in certain embodiments it may be desirable to incorporate one or more additional coolant flow fields into the stack or cassette architecture. More particularly, in addition to providing the components listed above, there also is provided at least one coolant flow field having at least one reagent manifold opening extending through the thickness thereof and at least one electrolyte manifold opening extending through the thickness thereof.

The invention further provides methods of manufacturing stacks of the invention. In preferred stack manufacturing methods provided by the present invention, the end plate is assembled with the electrochemical cassette prior to encapsulation by the resin and prior to introduction of the sealant such that the end plate and electrochemical cassette are encapsulated and sealed in combination.

In other preferred stack manufacturing methods provided by the present invention, the end plate is attached to the electrochemical cassette(s) after encapsulation in resin and introduction of the sealant into the sealant manifold openings. Typically, end plates which are attached after resin encapsulation are connected to the cassette by a compressive seal. In particularly preferred embodiments, the compressive seal may optionally comprise a gasket between the cassette and the end plate to insure a liquid or gas tight seal in the connection of the end plate and cassette. Alternatively, the end plate or the surface of the cassette may further include a sealing mechanism such that applying a compressive force to the aligned assembly of the cassette and the end plate results in the formation of a gas or liquid tight seal.

The present invention further provides methods of manufacturing the stacks which are suitable for use in fuel cells, flow through battery, electrochemical or ion exchange applications. The manufacturing method comprises the steps of assembling a stack comprising:

(a) at least one cassette and at least one end plate wherein each of the cassette(s) and end plate(s) have openings for at least one reagent manifold and at least one electrolyte manifold, wherein the cassettes are arranged in the stack such that the reactant manifold openings of each cassette are aligned to form at least one reactant manifold channel and wherein the liquid electrolyte manifold openings of each cassette are aligned to form at least one electrolyte manifold channel;

(b) at least one end plate attached to the top and/or bottom of the stack of cassettes such that the reactant manifold openings of the end plates align with the reactant channels of the stack of cassettes, the electrolyte manifold openings of the end plates align with the electrolyte channels of the stack of cassettes; and applying a compression means to seal the end plates and the cassettes into the stack.

In a preferred embodiment of the invention, cassettes and stacks of the invention comprise at least one manifold for delivery of a reagent to various flow fields and at least one manifold for delivery of an electrolyte to the liquid electrolyte flow fields. More preferred cassettes and stacks comprise two or more manifolds for delivery of reagents to the various flow fields of the cassette and two or more manifolds for delivery of electrolyte to the liquid electrolyte flow fields. In certain embodiments, in which one of the reagents is an oxidant such as air, dioxygen, or a gaseous mixture comprising dioxygen, or other oxidants including gaseous and liquid oxidants, the reagent may be delivered via a manifold or by providing one or more apertures connecting the atmosphere to the oxidant flow field such that the oxidant or other reagent may be delivered to the flow field by diffusion into the flow field from the surrounding atmosphere. In preferred embodiments, air is typically used for the oxidant.

In a preferred embodiment of the invention, the reagent flow fields are formed from wire mesh screens. Other flow field structures which are well known to the skilled artisan could be utilized as well such as a series of channels cut or otherwise impressed into the surface of an electrically conductive bipolar plate.

It is generally preferred that all of the components be cut to roughly the same shape and size perimeter. By way of illustration, two series of holes are created in the LEAs and separator plates, two sets for the manifolding of fuel (14), oxidant (12), and electrolyte (16) (an inlet at one portion and an outlet at another for each flow, see FIG. 1). Another set of holes (18) is created by which a sealing resin can be introduced while the encapsulation of the assembly is accomplished (see FIG. 1). Typically the LEA is preassembled wherein (1) the liquid electrolyte manifold openings in the electrode layers are substantially sealed with a resin; (2) the LEA is assembled by interposing the liquid electrode flow field in between the electrode layers; and (3) introducing a sealant into the reactant manifold openings such that pores and voids in the electrode and liquid electrolyte flow field surrounding the opening is filled with resin such that the LEA is bound together when the resin sets, cures, solidifies, or otherwise hardens. Lastly, reagent flow fields are cut from metal mesh screen with the same manifold holes as in the separator plates and LEAs. In addition, channels are cut in the screens that line up with the injection holes in the other elements of the cassette. Two separate patterns of channels are needed; one for each of the flow fields (corresponding to the distribution of fuel, oxidant). The placement of the holes and channels in the reagent flow fields and separator plates or in the bipolar plates have been described previously in our World Publication WO 03/036747, which is incorporated in the instant application in its entirety.

The layer size and number of layers in the cassettes and stacks of the invention are not particularly limited. Moreover, the layer size and number of layers the electrochemical cassettes and electrochemical cassettes of the invention are not particularly limited. Typically each flow field and/or liquid electrolyte assembly will be between about 1 $cm^2$ and about 1 $m^2$, however larger and smaller flow field layers and/or liquid electrolyte assembly layers may be suitable in certain applications. The layer size and number of layers the fuel cell or battery cassettes and fuel cell or battery stacks of the invention are capable of producing a sufficient power supply for a variety of applications. Frequently the power output fuel cell cassettes or battery cassettes of the invention will range from about 0.1 W to about 100 kW or more preferably from about 0.5 W to about 10 kW.

Figure 2:
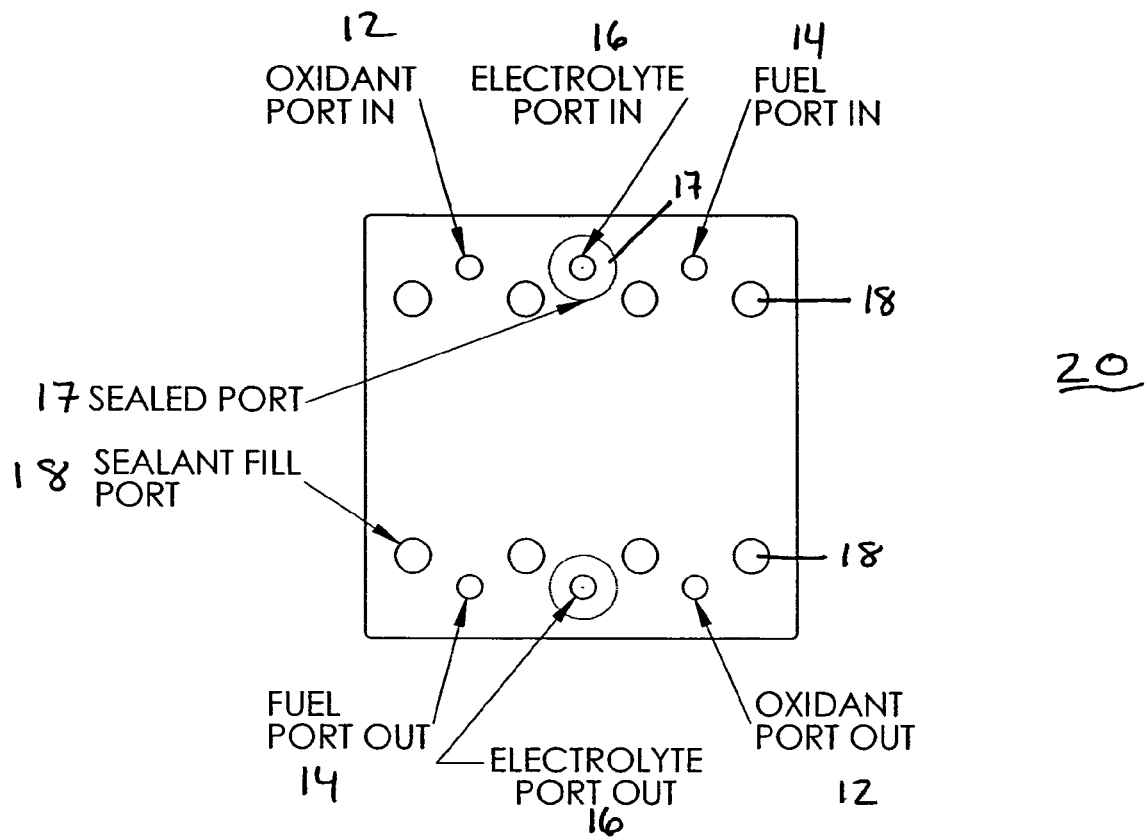
FIG. 2 shows a liquid electrolyte flow field with manifold and electrolyte opening and sealant manifold opening hole patterns of a porous conductive electrode with holes sealed by a resin for use in a liquid electrode assembly of a preferred embodiment of the invention, wherein the electrode is depicted with holes as sealed prior to incorporation into the liquid electrolyte assembly.
Figure 3:
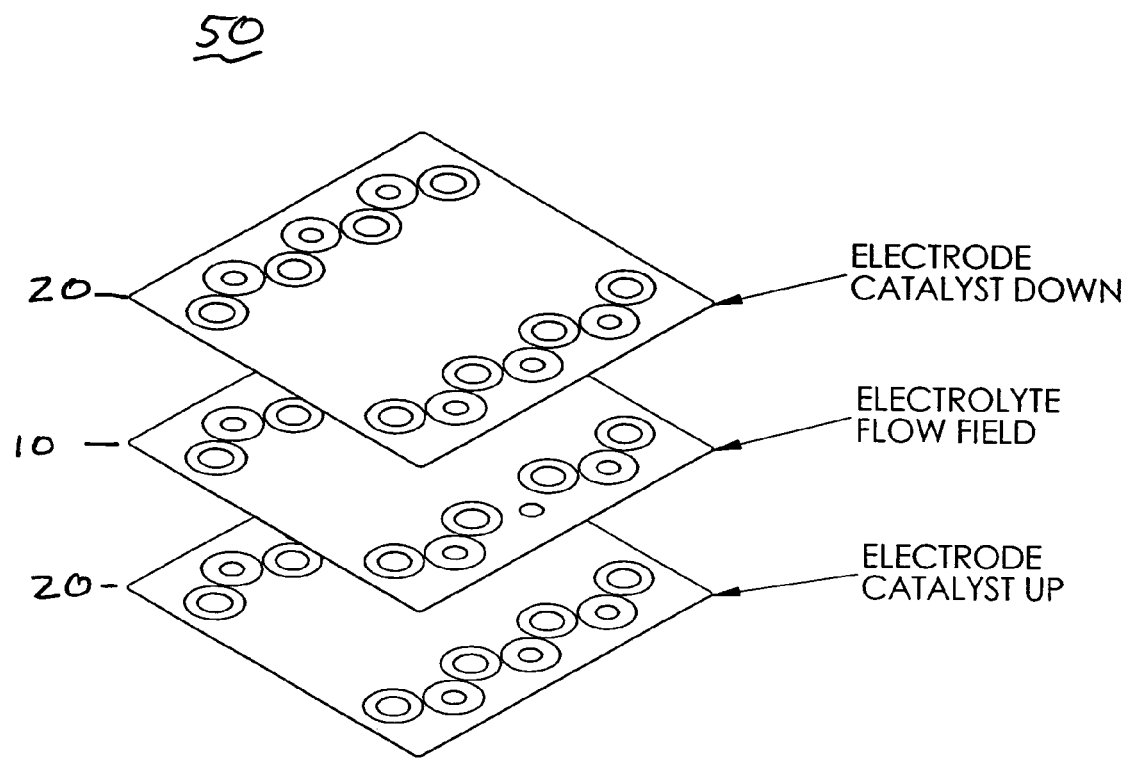
FIG. 3 shows an expanded view of a liquid electrolyte assembly having a liquid electrolyte flow field shown in FIG. 1 interposed between two electrodes shown in FIG. 2, wherein the liquid electrolyte flow field and the electrodes are depicted with holes sealed after incorporation into the liquid electrolyte assembly.
Figure 4:
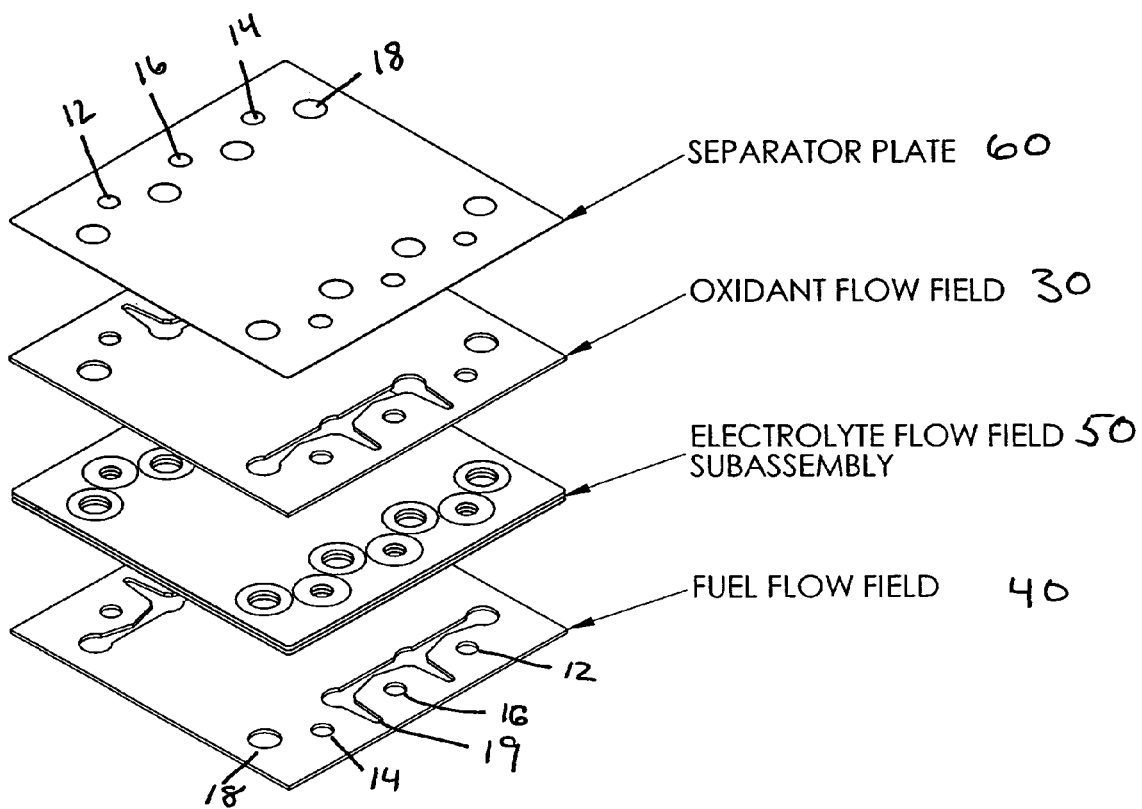
FIG. 4 shows an expanded view of the components of an electrochemical cassette of a preferred embodiment of the invention, prior to their encapsulation together.
Figure 5:
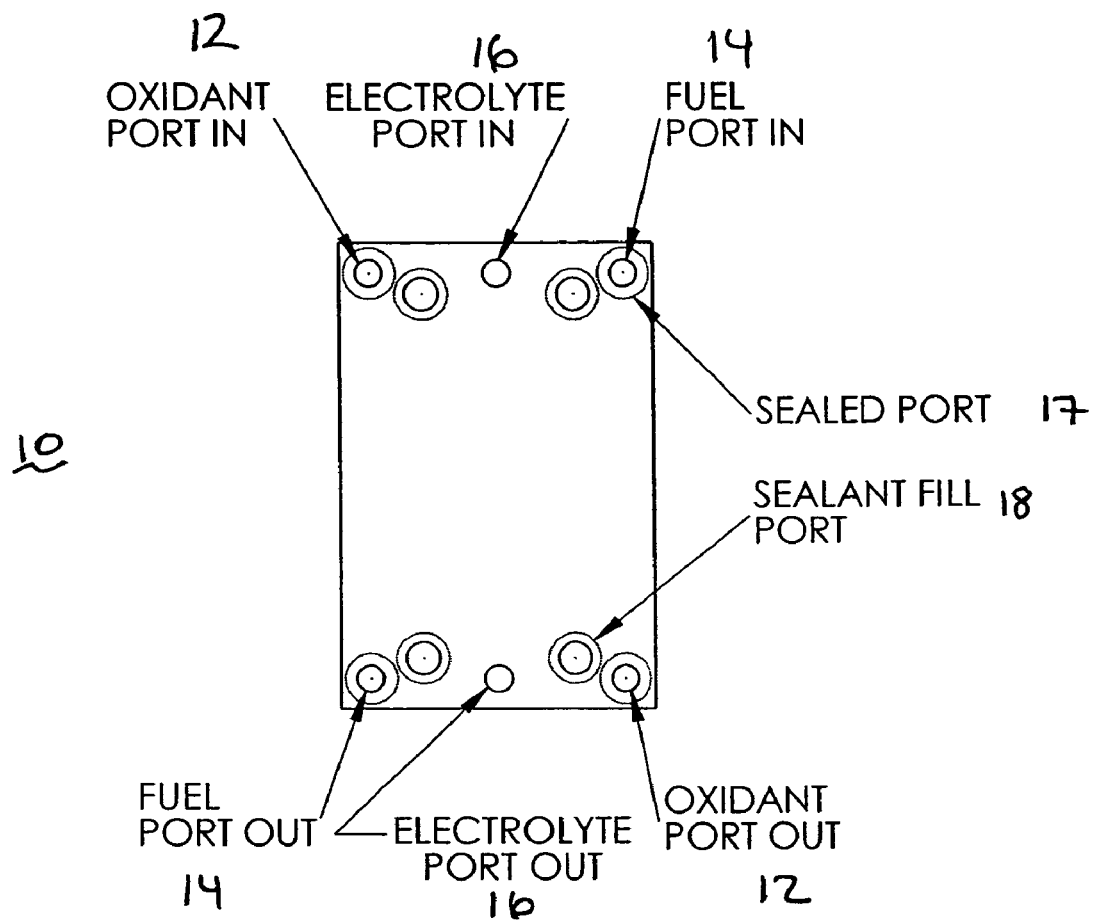
FIG. 5 shows a liquid electrolyte flow field with manifold and electrolyte opening and sealant manifold opening hole patterns with the screen for use in a liquid electrode assembly of a preferred embodiment of the invention after incorporation into the liquid electrolyte assembly.
Figure 6:
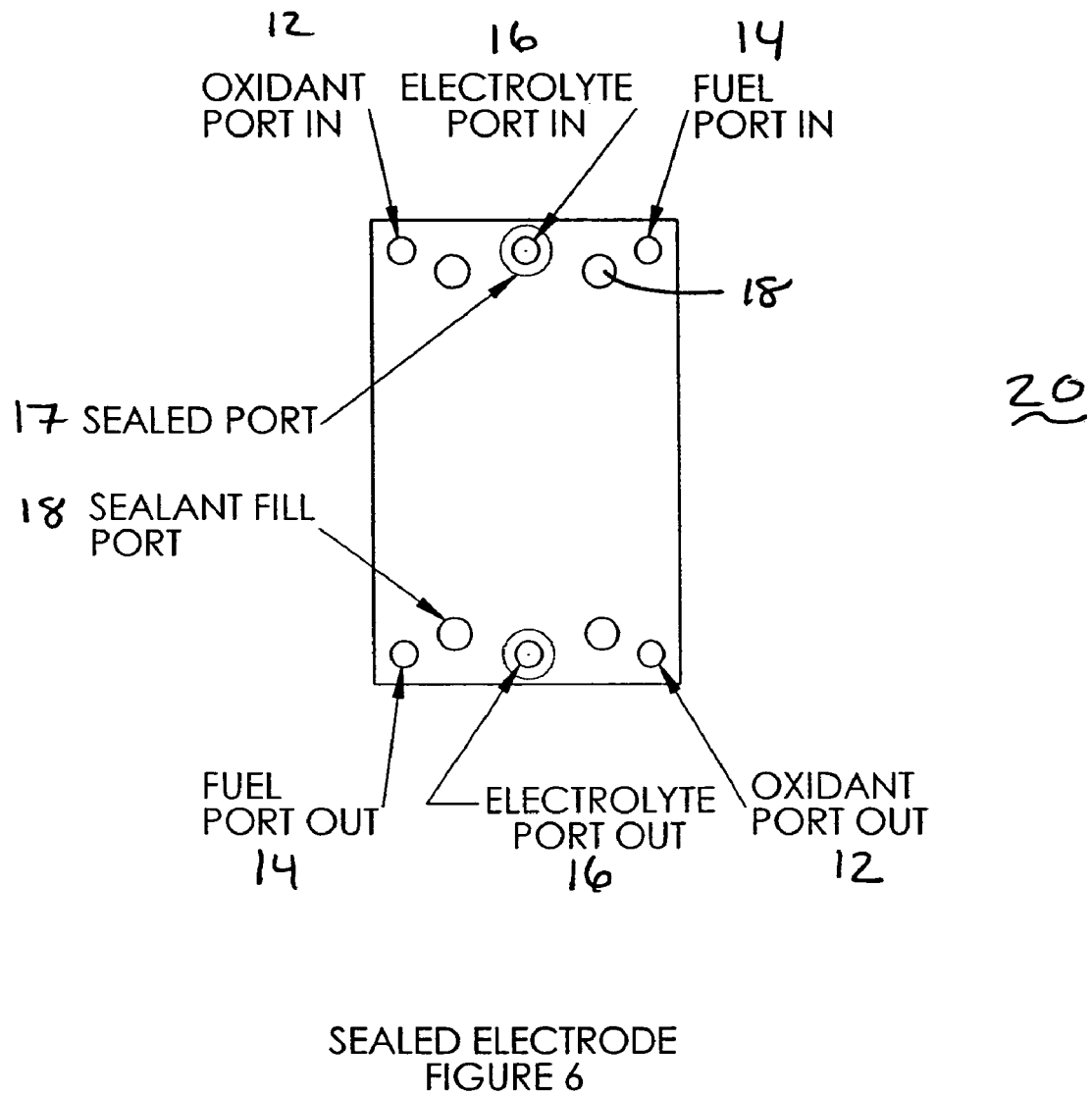
FIG. 6 shows a porous conductive electrode with manifold and electrolyte opening and sealant manifold opening hole patterns for use within in a liquid electrode assembly of a preferred embodiment of the invention prior to incorporation into the liquid electrolyte assembly.
Figure 7:
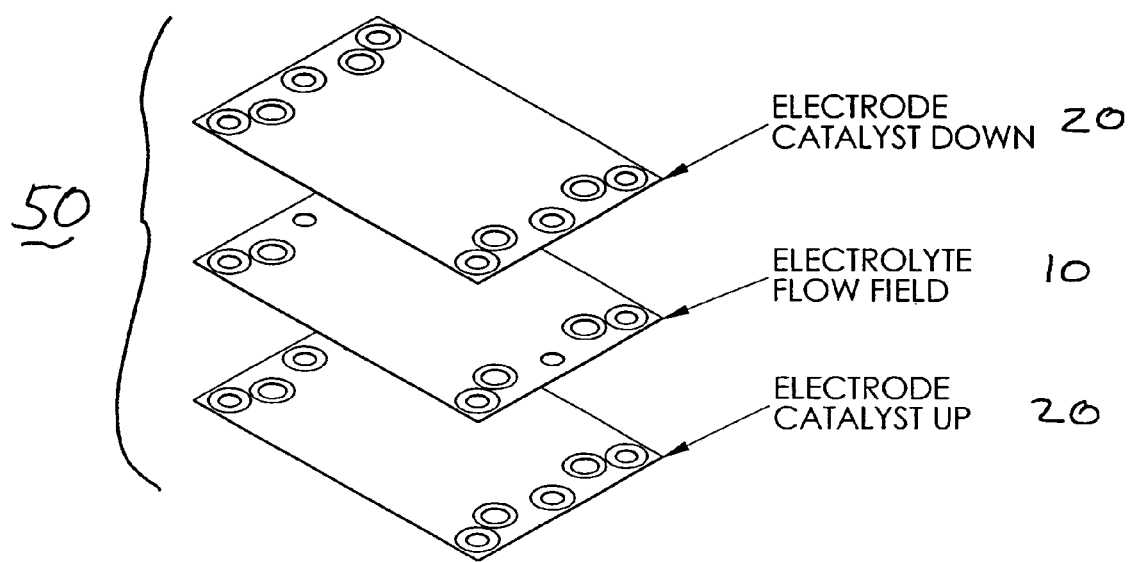
FIG. 7 shows an expanded view of a liquid electrolyte assembly having a liquid electrolyte flow field shown in FIG. 5 interposed between two electrodes shown in FIG. 6.

Referring now to FIG. 4, each of the components described above are assembled according to the desired fuel cell cassette design (such as number of units cells, number and placement of optional cooling layers). The most basic design would include a fuel flow field 40, an LEA 50 (represented by FIGS. 1-3), and an oxidant flow field 30 as the unit cell. Electrochemical cassettes 100 comprising assemblies with multiple unit cells would require the addition of one separator plate 60 (represented by the pattern shown in FIG. 4) in between each unit cell. Regardless of the particular design, the components are assembled in the desired design such that the injection holes and manifold openings of each component in the assembly are aligned and the assembly is placed within a mold or cavity. The assembly 100 is held in place within the mold by a top plate with an appropriate means of compression (i.e. a simple clamp).

Encapsulation of the electrochemical cassette assembly 100, a resin is introduced around the periphery, as well as within the injection holes of all assembled components. A vacuum is then pulled via the top plate through each of the manifold holes within the assembly. The pressure differential pulls resin into the edges of the assembly thereby encapsulating all the edges of the components in the assembly together and forming the assembly into a fuel cell cassette as described in our World Publication WO 02/43173. In addition, the same pressure differential pulls the resin introduced into the injection holes into the channels cut in each of the flow field components. The resin is drawn more quickly into the open channels than into the flow field material. The result is the sealing of each manifold around which the channels are cut. In the cassette assembly, each flow field is appropriately sealed such that only the manifold ports of interest remain open on each individual layer, the others are enclosed by the channels 19 or sealant manifolds 18 which are now sealed with resin or sealant 17.

The resin or sealant 17 used for encapsulation is selected such that it has the required chemical and mechanical properties for the conditions found in an operating electrochemical system (oxidative and electrolyte stability, for example). Typically the liquid electrolyte is an alkaline aqueous solution comprising an alkali metal hydroxide (e.g., $MOH_{(aq)}$ wherein M is Li, Na, K or the like) and suitable resins or sealants are chemically resistant to the electrolyte at the operating temperatures of the electrochemical cell. Appropriate resins/sealants include both thermoplastics and thermoset elastomers. Preferred thermoplastics include thermoplastic olefin elastomers, thermoplastic, polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

The pressure differential and time required to accomplish the sealing process is a function of the materials used in the electrochemical cassette construction. These include the type of flow field (i.e. the mesh size of the screen), the viscosity and flow characteristics of the resin, and the type of porous conductive electrode used in the LEA. Those skilled in the art will be able to judge the appropriate time and pressure based on these parameters. Those practicing the invention may also ascertain the most appropriate time and pressure by visual inspection during the sealing process with the use of transparent molds through which the resin progress can be seen in the topmost layer of the assembly.

The invention is further illustrated by the following non-limiting Example.

EXAMPLES OF THE INVENTION

Example 1

Figure 11:
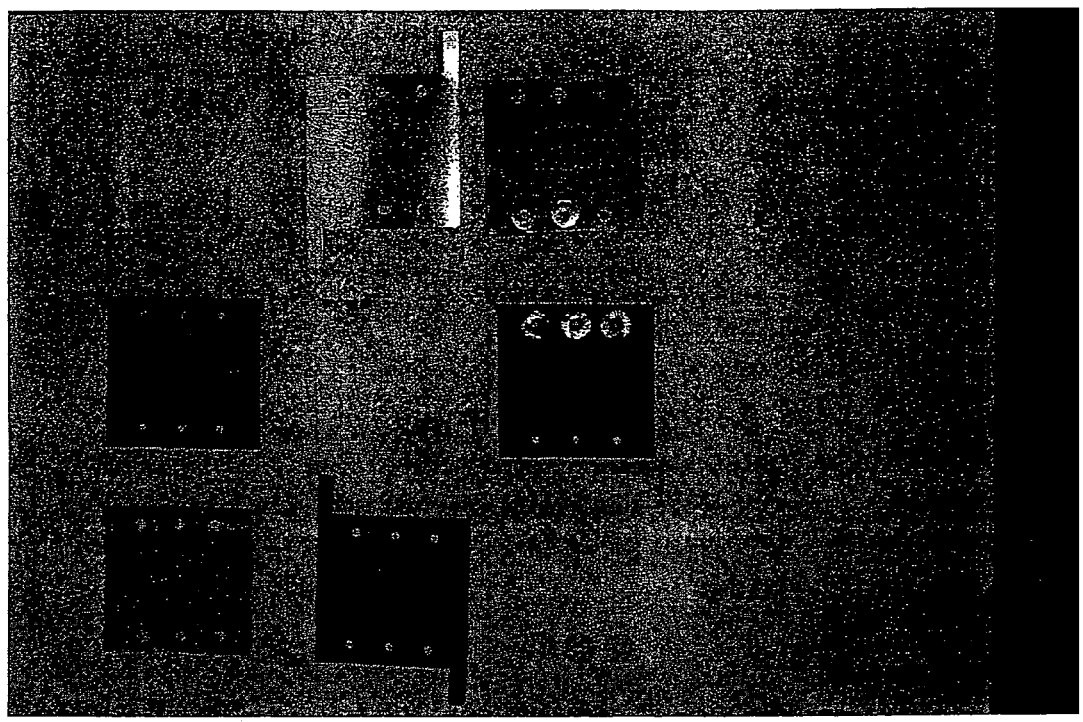
FIG. 11 shows parts from one particular test cell produced via the methodology above.

With reference to FIG. 11, the components are shown from one particular test cell produced via the methodology of the present invention as described above. The specific components include:

1,9 terminal screens of polyethylene for fabrication purposes only (all ports sealed);
2,8 separator plates (with current collector tabs) cut from 316 stainless steel;
3,7 flow field screens (316 stainless steel wire mesh) ports sealed according to provide one flow field for fuel and another flow field for oxidant;
4,6 electrodes made from carbon paper (Spectracorp) coated with platinum black (all ports sealed); and
5 electrolyte flow field from polyethylene screen (with fuel and oxidant flow field ports sealed).

Each of the port sealing operations was conducted previously using a two-part silicone. The components were assembled in a simple cavity mold according to the order given above. The components were surrounded with the same two part silicone used to seal the ports. A vacuum of approximately 3 inches of mercury was used to pull the silicone into the edges of each of the components. Once hardened, the resulting cassette was permanently bound together and could be removed from the mold as a unit.

Results.

Figure 12:
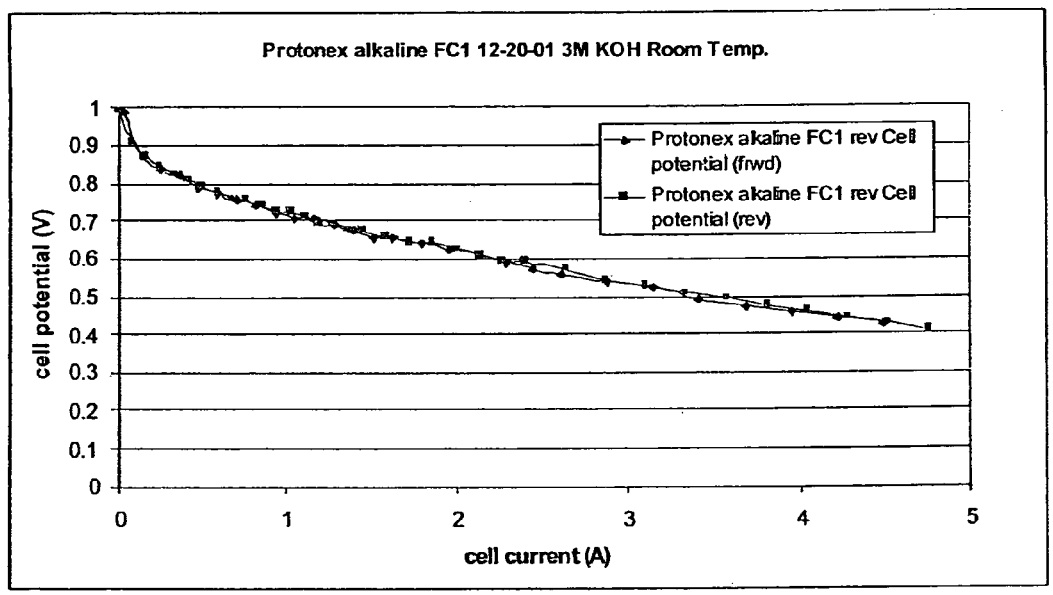
FIG. 12 shows a current/voltage curve for a single cell stack made via a preferred embodiment of the invention, as further described in the Examples.

FIG. 12 shows the results for the cassette in the previous example. As shown, the cassette was fixed between two end plates to provide compression and a means of facilitating, e.g., "hooking up", the various fuel, oxidant, and electrolyte flows. This particular stack was tested by recirculating potassium hydroxide electrolyte through the electrolyte flow field (with an external pump). Hydrogen and air were fed into their respective flow fields and a load applied to the stack. The single cell stack had an approximate active area of 20 $cm^2$.

Injection Molding.

Few changes would be made in the above described scheme to employ injection molding. With the use of two part resins (like the silicone used in the above Examples 1, we have shown that the resin can be injected into the channels by a driving pressure rather than pulling a vacuum on the internal ports. For traditional injection molding of a thermoplastic resin, the mold used would have to accommodate the temperature and pressure associated. Molten resin would be injected into the injection holes and around the edges of the assembly, allowed to cool and harden. Injection velocity profile, pack pressure, and cooling time would be optimized to minimize the possibility of component damage as well as to control shrinkage/warpage ensuring sealing of the final part. Lastly, the fuel cell cassette would be removed from the mold.

Other Electrochemical Devices.

The logic and design of the alkaline fuel cell can be extended to a number of other electrochemical devices with similar characteristics. Several acid based liquid electrolyte fuel cells are known (including phosphoric acid). In addition, there are a number of battery systems that require the recirculation of solutions for one or both of the anode or cathodes (while using a membrane separator). One suitable example would be zinc/bromine batteries in which electrolytes are recirculated on both the anode and cathode sides, while separated by a microporous membrane (see, e.g., *Handbook of Batteries*, David Linden, Chapter 37, 1995 edition).

The foregoing description of the present invention is merely illustrative thereof, and it is understood that variations and modification can be made without departing from the spirit or scope of the invention.

We claim:

1. An electrochemical cassette comprising at least one electrochemical cell which comprises:
    a liquid electrolyte flow field having at least one reactant manifold opening extending through the thickness thereof, at least one electrolyte manifold opening extending through the thickness thereof;
    a fuel flow field and an oxidant flow field, each component having at least one reactant manifold opening extending through the thickness thereof, at least one electrolyte manifold opening extending through the thickness thereof, and at least one sealant manifold opening extending through at least a portion of the thickness thereof, at least two gas permeable porous conductive electrodes having a catalyst deposited on a surface of each electrodes wherein the porous conductive electrodes are interposed between each of the oxidant flow field and the fuel flow field and the liquid electrolyte flow field such that the catalyst is in contact with the liquid electrolyte flow field;

wherein the one or more liquid electrolyte flow field, the oxidant flow field, the fuel flow field, and the porous conductive electrodes are assembled and encapsulated about the periphery thereof by a sealant; and wherein the sealant contemporaneously seals the respective channels of the one or more liquid electrolyte flow field, the oxidant flow field, the fuel flow field, and the porous conductive electrodes to selectively block one or more ports in proximity thereto.

2. The electrochemical cassette of claim 1, wherein the liquid electrolyte flow field comprises a porous insulating mesh, screen, or fabric.

3. The electrochemical cassette of claim 1, wherein the porous conductive electrode is composed of a hydrophobic material and is gas permeable.

4. The electrochemical cassette of claim 3, wherein the gas permeable porous conductive electrode is composed of at least one electrically conductive material.

5. The electrochemical cassette of claim 3, wherein the gas permeable porous conductive electrode is composed of at least one of a carbon paper, a woven carbon fabric or a porous carbon composite.

6. The electrochemical cassette of claim 1, wherein the cassette further comprises at least two electrochemical cells and a non-porous conductive separator plate having at least one reactant manifold opening extending through the thickness thereof, at least one electrolyte manifold opening extending through the thickness thereof, and at least one sealant manifold opening extending through at least a portion of the thickness thereof, and wherein the separator plate is interposed between an oxidant flow field and a fuel flow field of adjacent electrochemical cells of the electrochemical cassette.

7. The electrochemical cassette of claim 1, wherein the liquid electrolyte flow field and two porous conductive electrodes are assembled and sealed together with a resin about the periphery of each of the reactant manifold openings to form a liquid electrolyte assembly (LEA) prior to incorporation of the LEA into the electrochemical cassette, wherein the porous conductive electrodes have a resin distributed about the periphery of the electrolyte manifold openings prior to assembly.

8. The electrochemical cassette of claim 7, wherein the liquid electrolyte flow field and two porous conductive electrodes are bound together by a contemporaneous blinding of the non-electrolyte manifold openings with a resin prior to incorporation of the LEA into the electrochemical cassette.

9. The electrochemical cassette of claim 7, wherein the resin applied to the periphery of the fuel cell cassette is in contact with at least a portion of the sealant introduced into the sealant manifold.

10. The electrochemical cassette of claim 1, wherein the sealant introduced into the sealant manifold substantially encloses a reagent manifold opening which is not intended to deliver material to a particular flow field.

11. The electrochemical cassette of claim 7, wherein the sealant manifold comprises at least one aperture opening to the peripheral edge of one or more layers of the cassette such that the resin is introduced into the sealant manifold during encapsulation of the cassette.

12. The electrochemical cassette of claim 7, wherein at least one of the sealant and the resin is a thermoset material or a thermoplastic material.

13. The electrochemical cassette of claim 12, wherein at least one of the sealant and the resin is a silicone.

14. The electrochemical cassette of claim 7, wherein the resin and the sealant are composed of the same material.

15. The electrochemical cassette of claim 1, wherein the oxidant flow field comprises at least one aperture to the open air.

16. The electrochemical cassette of claim 6, the cassette comprising:

a liquid electrolyte assembly having at least one reactant manifold opening extending through the thickness thereof and at least one liquid electrolyte manifold opening extending through the thickness thereof;

at least two bipolar plates comprising an oxidant flow field and a fuel flow field wherein the bipolar plate has at least one manifold opening extending through the thickness thereof, at least one liquid electrolyte manifold opening extending through the thickness thereof, and at least one sealant manifold opening extending through at least a portion of the thickness thereof;

wherein the liquid electrolyte assembly and the bipolar plates are assembled relative to each other such that the reactant manifold openings are aligned; and wherein the peripheral edges of the liquid electrolyte assembly, the bipolar plates are encapsulated together by a resin such that the periphery of the fuel cell cassette is encapsulated by the resin and a sealant is introduced into the sealant manifold openings to enclose those manifold openings which are not intended to deliver material to a particular flow field.

17. The electrochemical cassette of claim 1, wherein at least one of an oxidant delivered to the oxidant flow field or a fuel delivered to the fuel flow field is either a liquid or gas.

18. The electrochemical cassette of claim 1, wherein the electrochemical cassette is a fuel cell cassette.

19. The electrochemical cassette of claim 18, wherein the catalyst is a metal or an inorganic or organometallic metal complex.

20. The electrochemical cassette of claim 1, wherein the electrochemical cassette is a flow through battery.

21. An electrochemical stack comprising:
(a) at least one electrochemical cassette comprising:
a fuel flow field and an oxidant flow field, each having at least one reactant manifold opening extending through the thickness thereof, at least one electrolyte manifold opening extending through the thickness thereof, and at least one sealant manifold opening extending through at least a portion of the thickness thereof; and
a liquid electrode assembly interposed between the fuel flow field and the oxidant flow field and having at least one reactant manifold opening extending through the thickness thereof, at least one electrolyte manifold opening extending through the thickness thereof;
(b) at least one end plate having one or more openings which align with the reactant and electrolyte manifold opening(s);

wherein a resin is introduced into the peripheral edges of the liquid electrolyte assembly, the fuel flow field, and the oxidant flow field to encapsulate the periphery of the electrochemical cassette, and a sealant is introduced into the sealant manifold openings to enclose those reactant manifold openings which are not intended to deliver material to a particular flow field; and wherein the end plate is assembled on the top and/or bottom of the stack of electrochemical cassettes such that the openings in the end plate align with the fuel flow field manifold openings, the oxidant flow field manifold openings, the electrolyte manifold openings and at least a portion of each sealant manifold openings of the electrochemical cassette.

22. The electrochemical stack of claim 21, wherein the liquid electrolyte assembly comprises
a liquid electrolyte flow field having at least one reactant manifold opening extending through the thickness thereof, at least one electrolyte manifold opening extending through the thickness thereof; and
at least two gas permeable porous conductive electrodes having a catalyst deposited on a surface of each electrode wherein the porous conductive electrodes are interposed between each of the oxidant flow field and the fuel flow field and the liquid electrolyte flow field such that the catalyst is in contact with the liquid electrolyte flow field.

23. The electrochemical cassette of claim 21, wherein the liquid electrolyte flow field comprises a porous insulating mesh, screen, or fabric.

24. The electrochemical cassette of claim 21, wherein the porous conductive electrode is composed of a hydrophobic material and is gas permeable.

25. The electrochemical cassette of claim 24, wherein the gas permeable porous conductive electrode is composed of at least one electrically conductive material.

26. The electrochemical cassette of claim 24, wherein the gas permeable porous conductive electrode is composed of at least one of a carbon paper, a woven carbon fabric or a porous carbon composite.

27. The electrochemical cassette of claim 22, wherein the stack further comprises at least two electrochemical cells and a non-porous conductive separator plate having at least one reactant manifold opening extending through the thickness thereof, at least one electrolyte manifold opening extending through the thickness thereof, and at least one sealant manifold opening extending through at least a portion of the thickness thereof, and wherein the separator plate is interposed between an oxidant flow field and a fuel flow field of adjacent electrochemical cells of the electrochemical cassette.

28. The electrochemical stack of claim 21, wherein the liquid electrolyte flow field and two porous conductive electrodes are assembled and sealed together with a resin about the periphery of each of the reactant manifold openings to form a liquid electrolyte assembly (LEA) prior to incorporation of the LEA into the electrochemical cassette, wherein the porous conductive electrodes have a resin distributed about the periphery of the electrolyte manifold openings prior to assembly.

29. The electrochemical stack of claim 28, wherein the liquid electrolyte flow field and two porous conductive electrodes are bound together by a simultaneous blinding of the non-electrolyte manifold openings with a resin prior to incorporation of the LEA into the electrochemical cassette.

30. The electrochemical stack of claim 21, wherein the resin applied to the periphery of the electrochemical cassette is in contact with at least a portion of the sealant introduced into the sealant manifold.

31. The electrochemical stack of claim 21, wherein the end plate is assembled with the electrochemical cassette prior to encapsulation by the resin and prior to introduction of the sealant such that the end plate and electrochemical cassette(s) are encapsulated and sealed in combination.

32. The electrochemical stack of claim 21, wherein after sealing and encapsulation of the electrochemical stack, at least a portion of the sealant is removed from at least one of the sealant manifold openings and a compression means is inserted into the empty sealant manifold opening to provide additional compressive force to the electrochemical stack.

33. The electrochemical stack of claim 21, wherein the end plate is attached to one or more electrochemical cassettes after encapsulation by the resin and introduction of the sealant into the sealant manifold openings.

34. The electrochemical stack of claim 21, wherein the end plate is attached by a compressive seal.

35. The electrochemical stack of claim 34, wherein after sealing and encapsulating of the one or more electrochemical cassettes, at least a portion of the sealant is removed from at least one of the sealant manifold openings and a compression means is inserted into the empty sealant manifold opening to provide additional compressive force to the electrochemical stack.

36. The electrochemical stack of claim 21, wherein at least one of the sealant or the resin is a thermoplastic material or a thermoset material.

37. The electrochemical stack of claim 21, wherein at least one of the end plates is composed of a thermoset polymer, a thermoplastic polymer, metal or a metal alloy.

38. The electrochemical stack of claim 21, wherein at least one of the end plates is composed of a filled polymer composite.

39. The electrochemical stack of claim 38, wherein the filled polymer composite is a glass fiber reinforced thermoplastic or a graphite reinforced thermoplastic.

40. The electrochemical stack of claim 21, wherein the electrochemical stack is a fuel cell stack.

41. The electrochemical stack of claim 21, wherein the electrochemical stack is a flow through battery stack.

42. A method of manufacturing an electrochemical cassette comprising the steps of:
(a) providing at least one liquid electrolyte assembly comprising two gas permeable porous conductive electrodes and a liquid electrolyte flow field interposed between the porous conductive electrodes and each component having at least one reagent manifold opening extending through the thickness thereof and at least one electrolyte manifold opening extending through the thickness thereof, wherein each electrolyte and reagent manifold opening of the porous conductive electrodes is at least substantially surrounded by a resin and each of the reagent manifold openings of the liquid electrolyte flow field is surrounded by a resin;
(b) providing at least one first reagent flow field having at least one reagent manifold opening extending through the thickness thereof, at least one electrolyte manifold opening extending through the thickness thereof, and at least one sealant manifold opening extending through at least a portion of the thickness thereof;
(c) providing at least one second reagent flow field having at least one reagent manifold opening extending through the thickness thereof, at least one electrolyte manifold opening extending through the thickness thereof, and at least one sealant manifold opening extending through at least a portion of the thickness thereof;

wherein the liquid electrolyte assembly, the first reagent flow field, and the second reagent flow field are assembled relative to each other such that the reagent manifold openings and electrolyte manifold openings are aligned; and sealing the periphery of the cassette and a portion of the cassette surrounding the sealant manifold by applying a pressure differential to the cassette.

43. The method of claim 42, wherein the liquid electrode assembly is prepared by the steps of:

infiltrating the pores of the porous conductive electrodes surrounding the electrolyte manifold opening(s) with a resin;

assembling the porous conductive electrodes and the liquid electrolyte flow field; and sealing the reagent manifold openings with a resin.

44. The method of claim 42, wherein the sealing step comprises the steps of:

surrounding the stacked formation with a resin;

introducing a sealant into the sealant manifold openings;

applying a pressure differential means to the stacked formation for a predetermined interval such that the resin is introduced into the peripheral edges of the stacked formation and such that the sealant is introduced into a portion of the cassette surrounding the sealant manifold openings;

allowing the sealant to set and/or cure thereby enclosing those manifold openings containing a reagent that does not correspond to a reagent for distribution to that particular flow field; and allowing the resin to set and/or cure thereby forming a bond between the peripheral edges of the liquid electrolyte assembly and the first and second reactant flow field such that the periphery of the stack is encapsulated within the resin.

* * * * *